US008210942B2

(12) United States Patent
Shimabukuro et al.

(10) Patent No.: US 8,210,942 B2
(45) Date of Patent: Jul. 3, 2012

(54) PORTABLE WAGERING GAME WITH VIBRATIONAL CUES AND FEEDBACK MECHANISM

(75) Inventors: Jorge L. Shimabukuro, Las Vegas, NV (US); Mark B. Gagner, West Chicago, IL (US); Jacob C. Greenberg, Elgin, IL (US)

(73) Assignee: WMS Gaming Inc., Waukegan, IL (US)

( * ) Notice: Subject to any disclaimer, the term of this patent is extended or adjusted under 35 U.S.C. 154(b) by 872 days.

(21) Appl. No.: 12/225,342

(22) PCT Filed: Mar. 30, 2007

(86) PCT No.: PCT/US2007/008240
§ 371 (c)(1),
(2), (4) Date: Sep. 19, 2008

(87) PCT Pub. No.: WO2007/117418
PCT Pub. Date: Oct. 18, 2007

(65) Prior Publication Data
US 2010/0160016 A1      Jun. 24, 2010

Related U.S. Application Data

(60) Provisional application No. 60/788,566, filed on Mar. 31, 2006.

(51) Int. Cl.
*G06F 17/00* (2006.01)

(52) U.S. Cl. ............ 463/30; 273/138.1; 273/138.2; 273/237; 273/301; 200/43.18; 200/314; 200/412; 200/510; 74/473.3; 74/483 PB

(58) Field of Classification Search ............ 463/16–21, 463/30, 36–37, 42, 46; 273/85, 138, 138.1, 273/138.2, 138 A, 139, 143 R, 148, 237, 273/269, 301; 200/5 D, 5 E, 43.18, 50.36, 200/295–296, 276.1, 314, 341, 345, 412, 417, 422, 510, 520, 530; 345/156, 173–174, 345/178–180; 73/1.19, 1.23, 1.56; 40/315, 40/464; 74/473.3, 483 PB
See application file for complete search history.

(56) References Cited

U.S. PATENT DOCUMENTS
5,889,670 A    3/1999  Schuler et al.
(Continued)

FOREIGN PATENT DOCUMENTS
WO    WO9956087    11/1999
(Continued)

OTHER PUBLICATIONS

TouchSense Technology for Touchscreens brochure by Immersion Corporation (2005), 4 pages.
(Continued)

*Primary Examiner* — Arthur O. Hall
(74) *Attorney, Agent, or Firm* — Nixon Peabody LLP

(57) ABSTRACT

A handheld gaming machine including one or more actuators for providing vibrational cues or feedback during play of a wagering game to indicate the occurrence of a wagering-game event, such as a change in game rules, an input of a wager, and the like. The change in game rules may include a change in the odds of winning an award during the wagering game, a change in the type of award that can be awarded during the wagering game, eligibility for bonus play, or eligibility to accumulate one or more game elements associated with the wagering game. The vibration can be consistent with a wagering-game theme and can accompany or be a substitute for concurrently played audio sounds. The actuator(s) may include a haptic device such as a haptic touchscreen that overlays the display or an electromagnetic coil acting upon an unbalanced mass.

33 Claims, 13 Drawing Sheets

U.S. PATENT DOCUMENTS

| | | | |
|---|---|---|---|
| 6,020,875 | A | 2/2000 | Moore et al. |
| 6,020,876 | A | 2/2000 | Rosenberg et al. |
| 6,024,576 | A | 2/2000 | Bevirt et al. |
| 6,104,158 | A | 8/2000 | Jacobus et al. |
| 6,252,579 | B1 | 6/2001 | Rosenberg et al. |
| 6,256,011 | B1 | 7/2001 | Culver |
| 6,281,651 | B1 | 8/2001 | Haanpaa et al. |
| 6,300,938 | B1 | 10/2001 | Culver |
| 6,304,091 | B1 | 10/2001 | Shahoian et al. |
| RE37,528 | E | 1/2002 | Hannaford et al. |
| 6,424,333 | B1 | 7/2002 | Tremblay et al. |
| 6,545,661 | B1 | 4/2003 | Goschy et al. |
| 6,563,487 | B2 * | 5/2003 | Martin et al. ............... 345/156 |
| 6,564,168 | B1 | 5/2003 | Hasser |
| 6,680,729 | B1 | 1/2004 | Shahoian et al. |
| 6,683,437 | B2 | 1/2004 | Tierling |
| 6,693,622 | B1 | 2/2004 | Shahoian et al. |
| 6,703,550 | B2 | 3/2004 | Chu |
| 6,704,683 | B1 | 3/2004 | Hasser |
| 6,762,745 | B1 | 7/2004 | Braun et al. |
| 6,781,569 | B1 | 8/2004 | Gregorio et al. |
| 6,833,846 | B2 | 12/2004 | Hasser |
| 6,864,877 | B2 * | 3/2005 | Braun et al. ............... 345/156 |
| 6,866,643 | B2 | 3/2005 | Kramer |
| 6,903,721 | B2 | 6/2005 | Braun et al. |
| 6,904,823 | B2 | 6/2005 | Levin et al. |
| 6,906,697 | B2 | 6/2005 | Rosenberg |
| 6,924,787 | B2 | 8/2005 | Kramer et al. |
| 6,933,920 | B2 | 8/2005 | Lacroix et al. |
| 6,937,033 | B2 | 8/2005 | Boronkay et al. |
| 6,965,370 | B2 | 11/2005 | Gregorio et al. |
| 6,979,164 | B2 | 12/2005 | Kramer |
| 6,995,744 | B1 | 2/2006 | Moore et al. |
| 7,024,625 | B2 | 4/2006 | Shalit |
| 7,050,955 | B1 | 5/2006 | Carmel et al. |
| 7,056,123 | B2 | 6/2006 | Gregorio et al. |
| 7,061,466 | B1 | 6/2006 | Moore et al. |
| 7,070,571 | B2 | 7/2006 | Kramer et al. |
| 7,096,852 | B2 | 8/2006 | Gregorio |
| 7,112,737 | B2 | 9/2006 | Ramstein |
| 7,116,317 | B2 | 10/2006 | Gregorio et al. |
| 7,151,432 | B2 | 12/2006 | Tierling |
| 7,154,470 | B2 | 12/2006 | Tierling |
| 7,159,008 | B1 | 1/2007 | Wies et al. |
| 7,161,580 | B2 | 1/2007 | Bailey et al. |
| 7,182,691 | B1 | 2/2007 | Schena |
| 7,196,688 | B2 | 3/2007 | Schena |
| 7,198,137 | B2 | 4/2007 | Olien |
| 7,202,851 | B2 * | 4/2007 | Cunningham et al. ........ 345/156 |
| 7,205,981 | B2 | 4/2007 | Cunningham |
| 7,233,476 | B2 | 6/2007 | Goldenberg et al. |
| 7,245,202 | B2 | 7/2007 | Levin |
| 7,280,095 | B2 | 10/2007 | Grant |
| 7,283,120 | B2 | 10/2007 | Grant |
| RE39,906 | E | 11/2007 | Roston et al. |
| 7,319,374 | B2 | 1/2008 | Shahoian |
| 7,331,868 | B2 | 2/2008 | Beaulieu et al. ............... 463/30 |
| 7,336,260 | B2 | 2/2008 | Martin et al. |
| 7,336,266 | B2 | 2/2008 | Hayward et al. |
| 7,369,115 | B2 | 5/2008 | Cruz-Hernandez et al. |
| 7,578,741 | B2 * | 8/2009 | Griswold et al. ............... 463/30 |
| 7,618,323 | B2 * | 11/2009 | Rothschild et al. ............ 463/37 |
| 2001/0005815 | A1 | 6/2001 | Rosenberg et al. |
| 2002/0080112 | A1 | 6/2002 | Braun et al. |
| 2003/0025723 | A1 | 2/2003 | Olien et al. |
| 2003/0076298 | A1 | 4/2003 | Rosenberg |
| 2006/0066569 | A1 | 3/2006 | Eid et al. |
| 2006/0109256 | A1 | 5/2006 | Grant et al. |
| 2006/0256075 | A1 | 11/2006 | Anastas et al. |
| 2007/0057913 | A1 | 3/2007 | Eid et al. |
| 2007/0182711 | A1 | 8/2007 | Grant et al. |
| 2007/0232348 | A1 | 10/2007 | Tierling et al. |
| 2007/0236449 | A1 | 10/2007 | Lacroix et al. |
| 2007/0236474 | A1 | 10/2007 | Ramstein |
| 2007/0242040 | A1 | 10/2007 | Ullrich et al. |
| 2007/0279401 | A1 | 12/2007 | Ramstein et al. |
| 2008/0024440 | A1 | 1/2008 | Olien et al. |
| 2008/0055244 | A1 | 3/2008 | Cruz-Hernandez et al. |
| 2008/0064499 | A1 | 3/2008 | Grant et al. |
| 2008/0068334 | A1 | 3/2008 | Olien et al. |
| 2008/0084384 | A1 | 4/2008 | Gregorio et al. |
| 2008/0100584 | A1 | 5/2008 | Hague et al. |

FOREIGN PATENT DOCUMENTS

| | | |
|---|---|---|
| WO | WO02078810 | 10/2002 |
| WO | WO03012557 | 2/2003 |
| WO | WO03032289 | 4/2003 |
| WO | WO03051062 | 6/2003 |
| WO | WO2004036405 | 4/2004 |
| WO | WO2004038573 | 5/2004 |
| WO | WO2004109488 | 12/2004 |
| WO | WO2004111818 | 12/2004 |
| WO | WO2004111819 | 12/2004 |
| WO | WO2005057546 | 6/2005 |
| WO | WO2005065113 | 7/2005 |
| WO | WO2005065147 | 7/2005 |
| WO | WO2006017254 | 2/2006 |
| WO | WO2006019389 | 2/2006 |
| WO | WO2006036458 | 4/2006 |
| WO | WO2006071449 | 7/2006 |
| WO | WO2007047960 | 4/2007 |
| WO | WO2007059172 | 5/2007 |
| WO | WO2008042745 | 4/2008 |
| WO | WO2008048831 | 4/2008 |

OTHER PUBLICATIONS

VibeTonz System brochure by Immersion Corporation (2005), 6 pages.

Integration by Immersion Corporation, printed on Mar. 17, 2006, 1 page.

Written Opinion corresponding to co-pending International Patent Application Serial No. PCT/US2007/008240, United States Patent Office, dated Oct. 1, 2008, 3 pages.

International Search Report corresponding to co-pending International Patent Application Serial No. PCT/US2007/008240, United States Patent Office, dated Oct. 1, 2008, 2 pages.

* cited by examiner

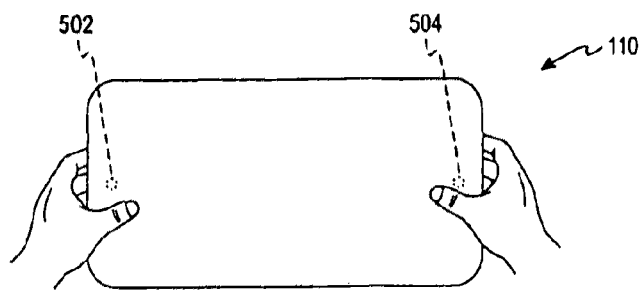
*Fig. 5a-1*
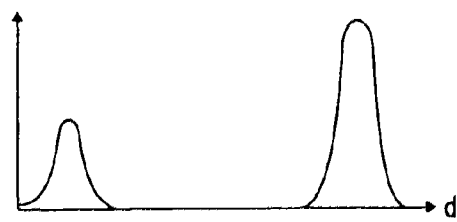
*Fig. 5a-2*
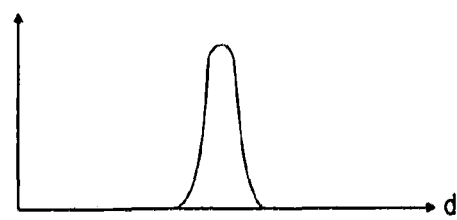
*Fig. 5a-3*
*Fig. 5a-4*

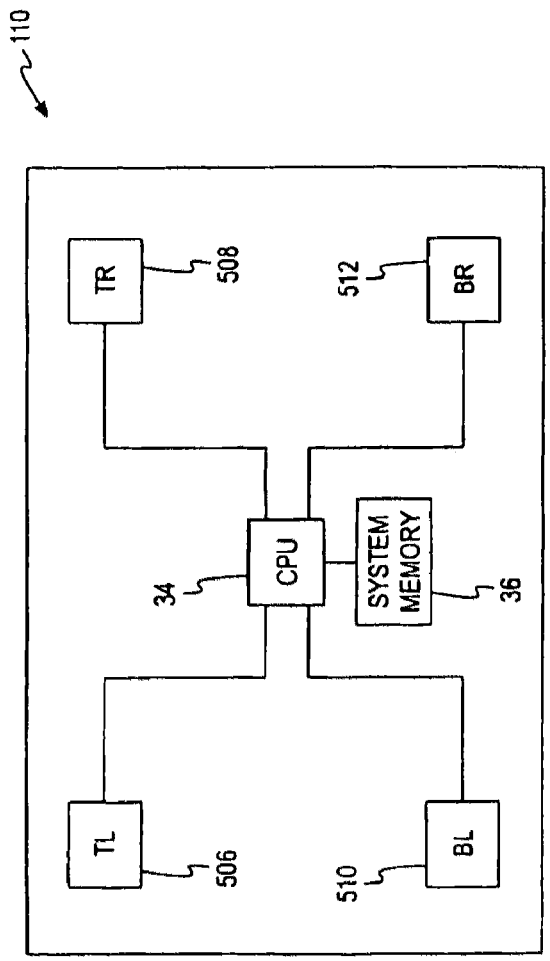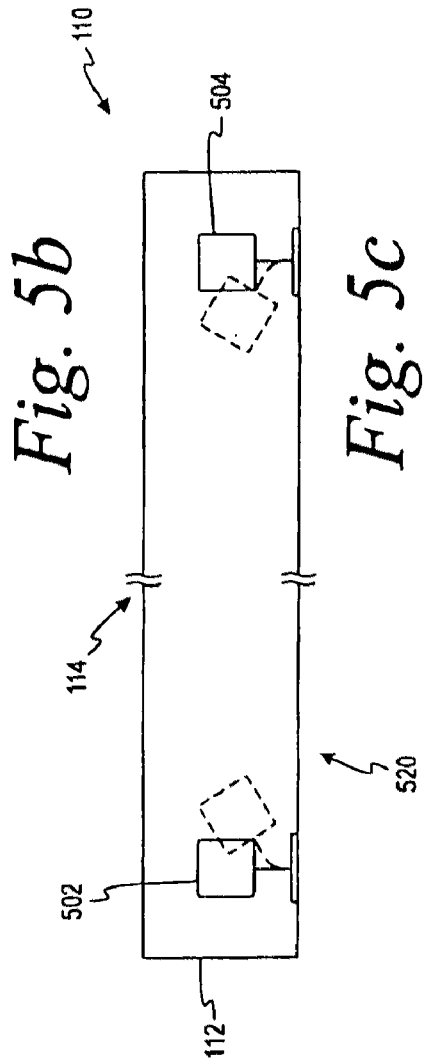
Fig. 5b
Fig. 5c

# PORTABLE WAGERING GAME WITH VIBRATIONAL CUES AND FEEDBACK MECHANISM

CROSS-REFERENCE TO RELATED APPLICATION

This application is a U.S. National Stage of International Application No. PCT/US2007/008240, filed Mar. 30, 2007, which claims the benefit of U.S. Provisional Application No. 60/788,566, filed on Mar. 31, 2006, both of which are incorporated herein by reference in their entirety.

This application is related to co-pending U.S. Provisional Patent Application Ser. No. 60/715,237, entitled "Gaming Machine Having Display With Sensory Feedback," filed on Sep. 8, 2005.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a portable wagering gaming machine having one or more vibrating devices that provide vibrational cues or feedback to indicate a wagering-game event.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

Gaming machines have also utilized a variety of output devices for producing an audio or visual experience to the player. However, these output devices only engage the senses of hearing or sight. In portable, handheld gaming machines that are held by the player's hands or rested on a player's lap, some part of the player's body maintains contact with the handheld gaming device, opening up the possibility that the player's sense of touch can be engaged in addition to hearing and sight. Just as the cooperation of a player's left and right ears can be used to pinpoint the direction and distance of a sound transmission, so too can a player's sense of touch be used to create the perception that feedback is emanating from a specific point relative to the handheld gaming machine. This sense of touch has not been exploited heretofore on a handheld gaming machine.

Thus, a need exists for an improved apparatus and method. The present invention is directed to satisfying one or more of these needs and solving other problems.

SUMMARY OF THE INVENTION

According to one aspect of the present invention, a handheld gaming machine includes an input device for receiving a wager to initiate a wagering game, a video display for displaying the wagering game on the handheld gaming machine, at least one actuator, and a controller coupled to the video display and to the actuator. The controller is programmed to cause the wagering game to be displayed on the video display and to cause the actuator to produce a vibration that indicates the occurrence of a wagering-game event. The wagering-game event includes a change in game rules, such as a change in the odds of winning an award during the wagering game, a change in the type of award that can be awarded during the wagering game, or the receipt of a wager by the input device on the handheld gaming machine. The vibration can be consistent with a theme of the wagering game, such as a slot wagering game and the vibration is a series of vibrations that simulate the tactile sensation of multiple reels decelerating and coming to a stop, a roulette wagering game and the vibration is a series of vibrations that simulate the tactile sensation of a spinning roulette wheel, a card wagering game and the vibration simulates the tactile sensation of a card being placed upon a surface.

The vibration indicating a change in game rules can be produced independent of changes between normal game play and bonus round game play of the wagering game. The change in game rules include eligibility for bonus play, or eligibility to accumulate one or more game elements associated with the wagering game.

In some aspects, the at least one actuator includes a haptic touch screen, and in other aspects, the at least one actuator includes an electromagnetic coil coupled to a movable mass. In other aspects, the handheld gaming machine includes at least two actuators, which are optionally rotatable about an axis in three-dimensional space. The actuator(s) may be coupled to the housing of the handheld gaming machine to transmit vibrations to the player via the housing. In still other aspects, the handheld gaming machine includes three actuators, each one positioned along an axis that is different from those of the other two actuators. In still further aspects, the handheld gaming machine includes four actuators.

In some aspects, the controller is further programmed to generate sounds through one or more speakers on the handheld gaming machine such that the sounds and the vibration are synchronized to indicate the wagering-game event.

In some aspects, the vibration is generated according to a vibrating profile which includes a vibration pattern, amplitude, and duration. The vibrating profile can include information representing an axis of rotation of the at least one actuator in three-dimensional space. The vibration pattern can include multiple frequency components, at least some of which are out-of-phase relative to one another.

According to another aspect of the present invention, a method of conducting a wagering game on a handheld gaming machine, the method includes receiving a wager to initiate a wagering game, displaying the wagering game on the handheld gaming machine, and indicating the occurrence of a wagering-game event by causing an actuator in the handheld gaming device to move a movable structure. The method may further include generating sounds through one or more speakers on the handheld gaming machine, the sounds and the vibration being synchronized to indicate the wagering-game event. In some aspects, the method further includes retrieving a vibrating profile corresponding to the wagering-game event and transmitting to the vibration device the vibrating profile, the vibrating profile being indicative of a vibration pattern, vibrating amplitude, and vibrating duration.

According to still another aspect of the present invention, a computer readable storage medium is encoded with instructions for directing a handheld gaming machine to perform a method according to any of the aspects of the present invention.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 5a-1 is a functional block diagram of a handheld gaming machine including a left actuator and a right actuator according to an aspect of the present invention;

FIG. 5a-2 is an amplitude chart showing a vibrating profile of the left and right actuators of the handheld gaming machine shown in FIG. 5a-1;

FIG. 5a-3 is an amplitude chart showing the position of a vibration that is perceived by a player as a result of the vibrating profiles shown in FIG. 5a-2;

FIG. 5a-4 are amplitude charts illustrating two out-of-phase vibrations, creating a perception to the player that a vibration is moving across the handheld gaming machine shown in FIG. 5a-1;

FIG. 5b is a functional block diagram of a handheld gaming machine including four actuators, one each in the top-left, top-right, bottom-left, and bottom-right hand corners of the handheld gaming machine according to another aspect of the present invention;

FIG. 5c is a cut-away view of the front of the handheld gaming machine shown in FIG. 1b with two actuators that are rotatable about an axis such that each actuator can actuate on more than one axis;

DETAILED DESCRIPTION

Figure 1A:
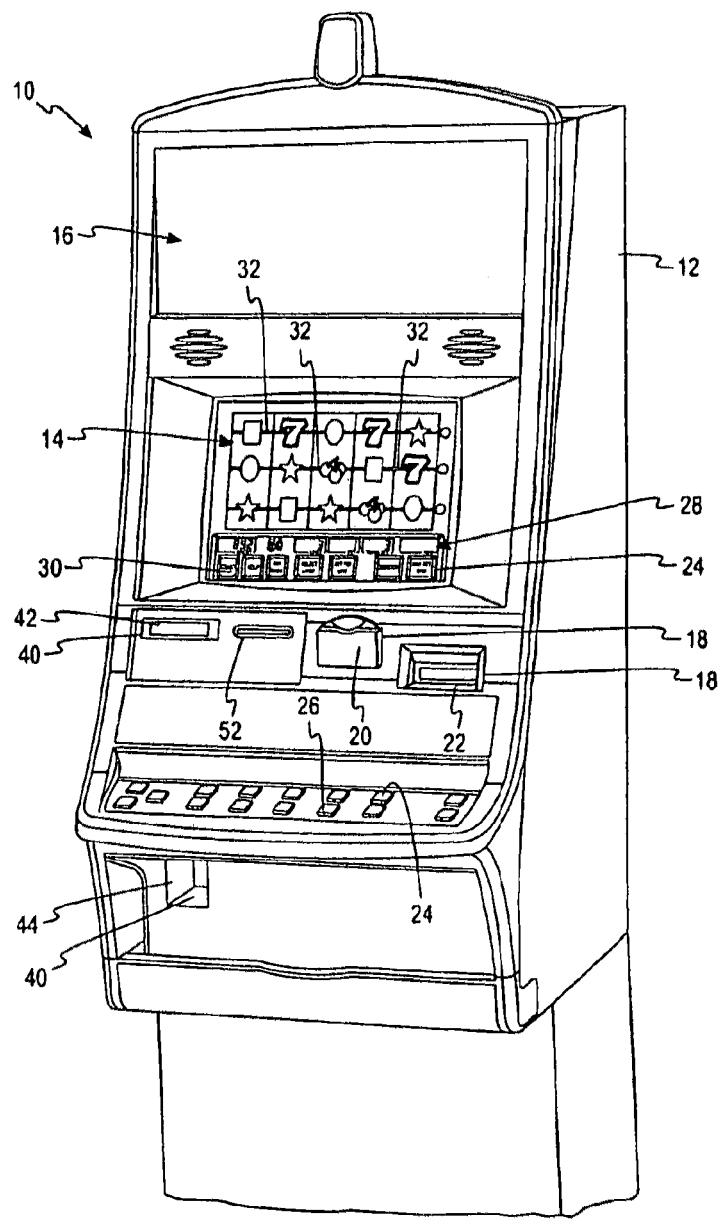
FIG. 1a is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1a, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may, also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1a). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1a, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1a as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
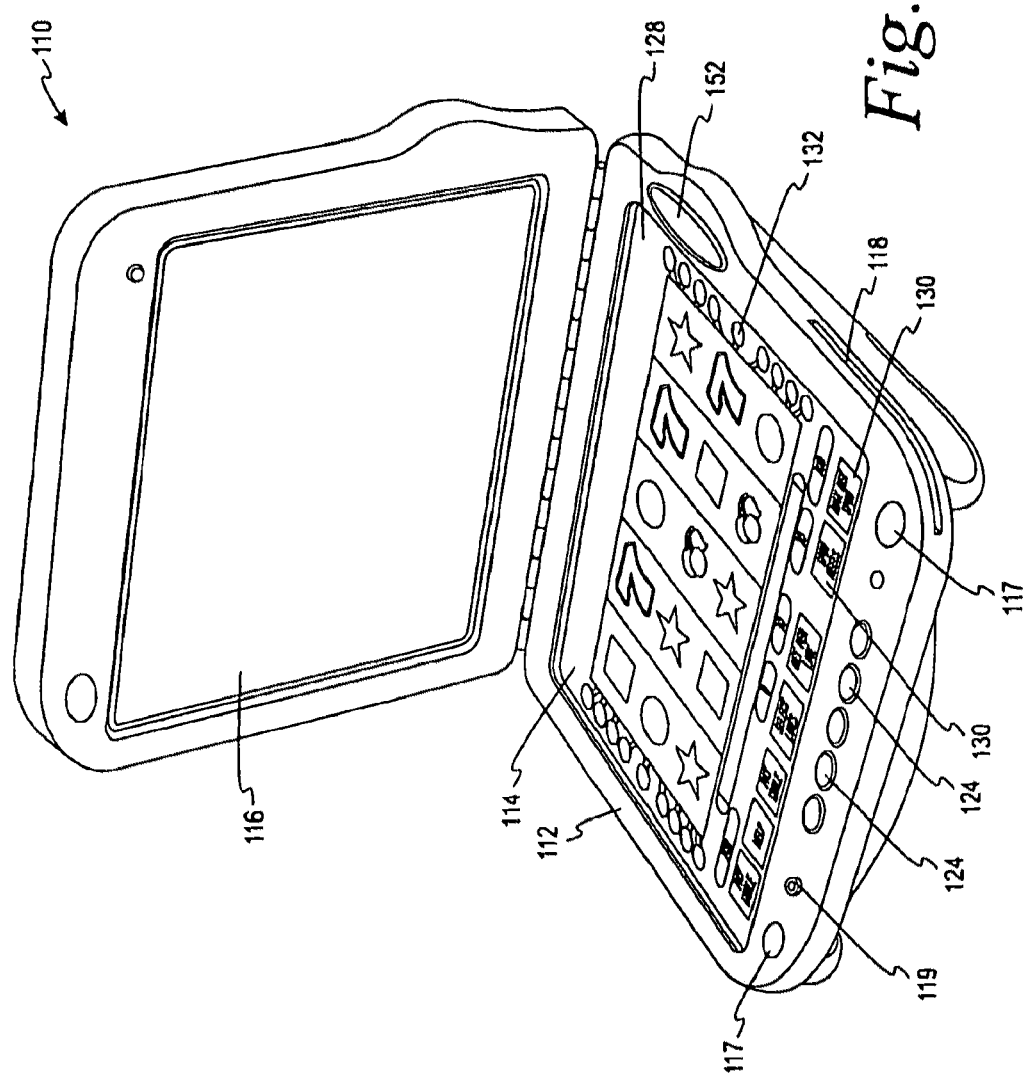
FIG. 1b is a perspective view of a handheld gaming machine embodying the present invention.

Depicted in FIG. 1b is a handheld or mobile gaming machine 110. Like the free standing gaming machine 10, the handheld gaming machine 110 is preferably an electronic gaming machine configured to play a video casino game such as, but not limited to, blackjack, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1b, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons 126 on a button panel for operating the handheld gaming machine 110. In addition, or alternatively, the player input device 124 may comprise a touch screen mounted to a primary display 114 and/or secondary display 116. In one aspect, the touch screen is matched to a display screen having one or more selectable touch keys 130 selectable by a user's touching of the associated area of the screen using a finger or a tool, such as a stylus pointer. A player enables a desired function either by touching the touch screen at an appropriate touch key 130 or by pressing an appropriate push button 126 on the button panel. The touch keys 130 may be used to implement the same functions as push buttons 126. Alternatively, the push buttons 126 may provide inputs for one aspect of the operating the game, while the touch keys 130 may allow for input needed for another aspect of the game. The various components of the handheld gaming machine 110 may be connected directly to, or contained within, the casing 112, as seen in FIG. 1b, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 10. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1, comprises a biometric sensing device.

Figure 2:
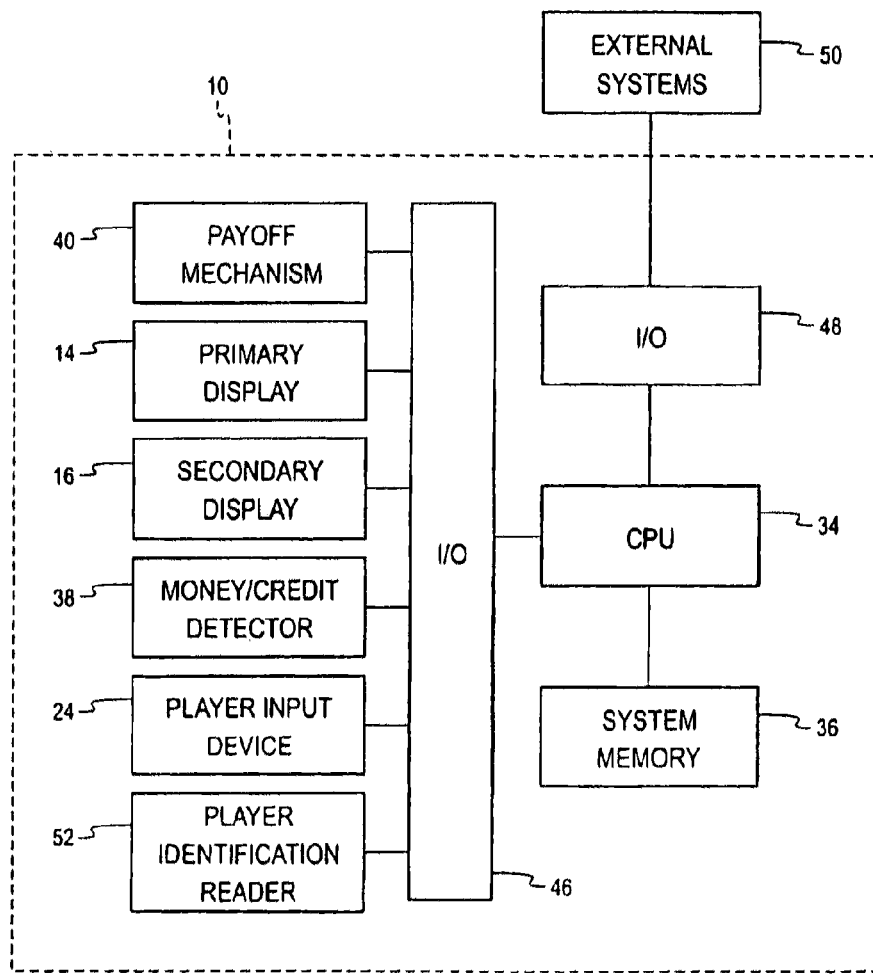
FIG. 2 is a block diagram of a control system suitable for operating the gaming machines of FIGS. 1a and 1b.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10, 110 may communicate with external systems 50 (in a wired or wireless manner) such that each machine operates as a "thin client," having relatively less functionality, a "thick client," having relatively more functionality, or through any range of functionality therebetween. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10, 110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3A:
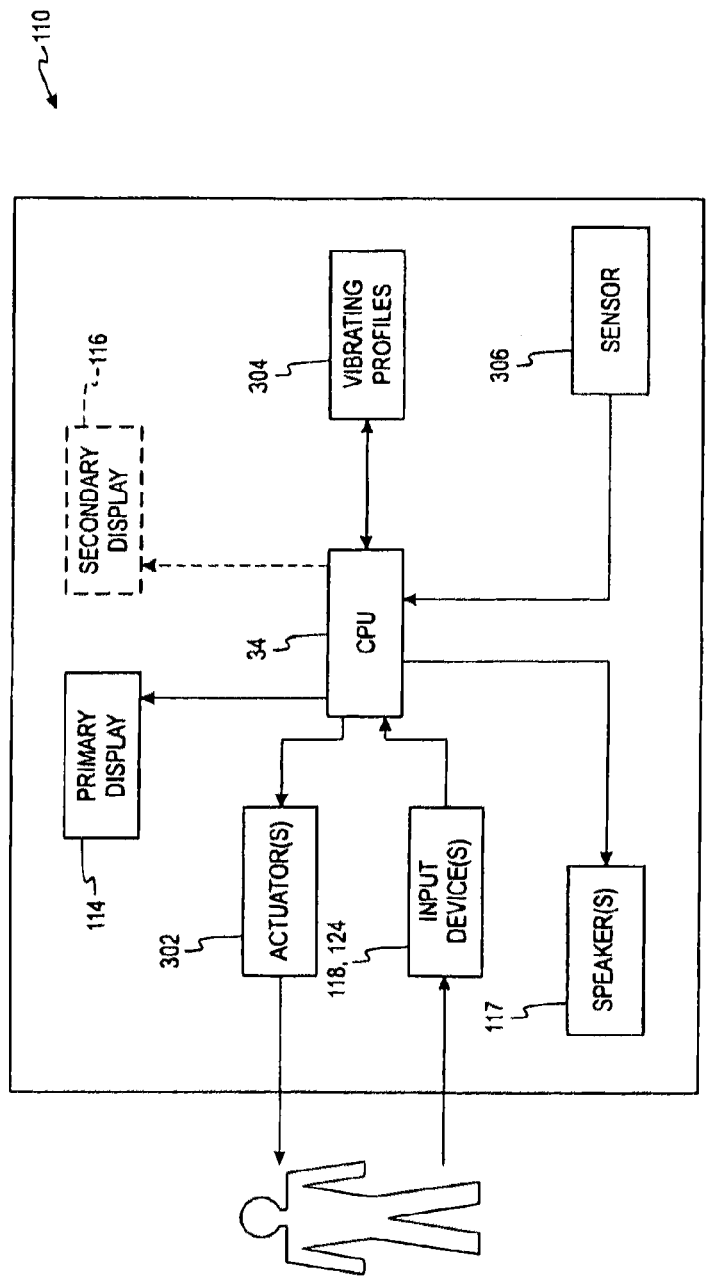
FIG. 3a is functional block diagram of a handheld gaming machine including one or more actuators according to an aspect of the present invention.

FIG. 3a is a functional block diagram of a handheld gaming machine 110 including one or more actuators 302 coupled to the controller 34 to supply vibrational cues or feedback during play of a wagering game to indicate a wagering-game event and one or more sensors 306. Examples of a wagering-game event are described below. The player's tactile sense (which is part of the somatic senses) is engaged when the player interfaces with the input devices 118, 124 on the handheld gaming machine 110, and haptic or tactile vibrational cues or feedback from the handheld gaming machine are provided by way of the actuators 302.

Figure 3B:
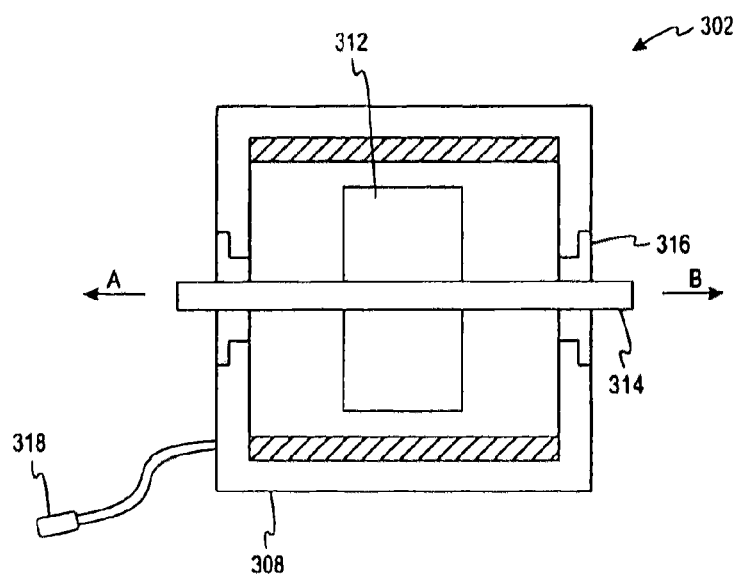
FIG. 3b is a cross-sectional illustration of an exemplary linear actuator suitable for use in the handheld gaming machine of FIG. 3a according to an aspect of the present invention.

In the illustrated embodiment, the actuators 302 operate under control of the controller 34, however, those skilled in the art will readily appreciate that the actuators 302 may operate under the control of a separate actuator controller that communicates with the actuators 302 to cause them to actuate a solenoid, a motor or other moving mass (such as a piezoelectric element), which in turn translates the motion into a tactile sensation transmitted to the player. In a preferred embodiment, the actuators 302 include an electromagnetic coil that acts upon a suspended (optionally unbalanced) mass akin to a voice-coil actuator. The coil drives the mass, which is significant enough to produce a vibration that can be sensed by the player's sense of touch. A class of suitable actuators are known as voice-coil actuators, and they can be linear actuators or rotary actuators. An example of a moving magnet voice-coil linear actuator is shown in FIG. 3b and discussed below. In another embodiment, the actuators 302 include a permanent magnet whose magnetic forces act upon a movable mass.

Alternately, the actuators 302 include a motor that moves a "knocker" against a portion of the handheld gaming machine 110 with sufficient force to be perceived by the player's tactile senses. The actuators 302 can be linear actuators or rotary actuators. The terms haptic, tactile, and touch are used interchangeably herein. Note that the use of the plural "actuators" herein is intended to mean one or more actuators.

In other embodiments, a component of the handheld gaming machine 110 can be moved, such as the battery, speakers 117, or the display 114, 116. The component vibrates with sufficient force such that its movements are not visibly perceptible by the player but can still be tactilely perceived.

Visible shaking of the handheld gaming machine 110 would undesirably effect the player's ability to view the displays 114, 116.

The sensor(s) 306 senses an environmental characteristic of the handheld gaming machine 110, and the actuators 302 can be adjusted dynamically depending upon the characteristics sensed by the sensor 306. For example, the sensor 306 can be a "tilt" sensor or a ⅔-axis accelerometer that senses the angle relative to earth at which the handheld gaming machine 110 is being held. If the handheld gaming machine 110 is placed on a flat surface, such as a tabletop, the tilt sensor 306 will output a signal indicating that the handheld gaming machine 110 is parallel to the ground. If the handheld gaming machine 110 is placed on the player's lap, the tilt sensor will output a signal indicating that the handheld gaming machine 110 is being held anti-parallel to the ground. In each scenario, the force or torque applied by the actuators 302 can be adjusted for the differing environmental characteristics.

The sensor(s) 306 can also sense whether the handheld gaming machine 110 is being held by one hand or two hands. For example, pressure sensors 306 located proximate the sides of the handheld gaming machine 110 where the hands would most likely grasp the machine 110 sense the amount of pressure applied to those areas. The force or torque applied by the actuators 302 can be diminished or enhanced as a function of the number of hands grasping the machine 110 to ensure that the vibrations are felt by the player. In this aspect, the environmental characteristic is the number of hands grasping the handheld gaming machine 110. In other aspects, the sensors 306 can include other sensors, such as sensors that detect and/or measure the amount of ambient noise or light.

A memory 304 storing one or more vibrating profiles is coupled to the controller 34. In another embodiment, the vibrating profiles are stored in a portion of the system memory 36 of the handheld gaming machine. A vibrating profile includes data or a formula representing a vibration pattern, a vibration amplitude, and a vibration duration. The vibrating profile may also include information for rotating actuators representing an axis in three-dimensional space along which a vibration is to be transmitted. Embodiments with rotating actuators are described in connection with FIGS. 5c and 5d below. The vibration pattern includes one or more frequency components, each frequency representing the frequency at which the actuator 302 produces a vibrational cue or feedback. The vibrating profile can be used to create anticipation or suspense in the form of vibrational cues that are transmitted to the player and to indicate vibrational feedback to the player in response to an action taken by the player. The controller 34 adapts the vibrating profile to cause the actuators 302 to vibrate according to the vibration pattern at the vibration amplitude for the vibration duration indicated by each vibrating profile, and/or as a function of one or more environmental characteristics sensed by the sensor(s) 306. In embodiments having more than one actuator 302, each actuator can have its own associated vibrating profile (for out-of-phase vibrations), or multiple actuators can be associated with the same vibrating profile (for in-phase vibrations). Examples of some graphical amplitude curves corresponding to various vibrating profiles are shown in FIGS. 6a and 6b, described in more detail below.

In an embodiment, the actuator 302 includes a haptic device such as a haptic touch screen manufactured by Immersion Corporation of San Jose, Calif., under the trade designation TouchSense®. In this embodiment, the haptic touch screen 302 overlaps part or all of the primary display 114 and/or the secondary display 116 of the handheld gaming machine 110. Alternately, the haptic device can be incorporated into the primary display 114 and/or secondary display 116. The haptic touch screen 302 can be used as an accompaniment or substitute for audio sounds. Haptic device embodiments are discussed below in connection with FIGS. 7a-8b.

The speakers 117 of the handheld gaming machine 110 can be synchronized with the vibrating profiles to deliver audio sound synchronized with vibrations. This engages the aural (hearing) and haptic (touch) senses of the player. In addition, the primary display 114 and/or the secondary display 116 can display images consistent with the audio sound and vibrations, engaging not only the aural and haptic senses but also the visual sense. Three senses of the player are engaged, which can significantly enhance a wagering-game experience, increasing excitement, interactivity, and interest in the wagering game being played. Because part of the player's body maintains contact with the handheld gaming machine (such as the hands or the lap or both), the player's haptic sense can be engaged throughout game play. At the same time, the present invention reduces player fatigue and boredom, which can undesirably cause the player to stop playing. Another advantage to vibrational cues and feedback in accordance with the present invention is that the wagering-game experience is uniquely personal to the player. With respect to traditional or legacy gaming machines, onlookers can hear and see a wagering game being played. With respect to the handheld gaming machine of the present invention, although onlookers may still be able to hear and see the wagering game being played, only the player of the handheld gaming machine perceives the vibrational cues and feedback emanating from the handheld gaming machine, providing that player with a unique ownership in the wagering-game experience while still attracting interest in the wagering games on the handheld gaming machine via the aural and vision senses.

FIG. 3b is a cross-sectional illustration of the actuator 302 depicted as a linear actuator having a housing 308 surrounding a magnet 310 and a coil 312. A shaft 314 is linearly displaced along an axis in two directions A, B through the bushing 316 by activation of the coil 312. Leads 318 connect the actuator to an actuator controller (not shown). Depending on the polarity of the applied excitation to the coil 312, the shaft 314 is propelled in one direction or the other. The actuator 302 can be positioned so that the shaft 314 strikes some part of the handheld gaming machine 110, such as the casing 112 or a structure connected to the casing 112, thereby transmitting vibrations through the handheld gaming machine 110 to the player's body. In some embodiments, the magnet in the actuator 302 is fixed; in other embodiments, the magnet moves.

Figure 3C:
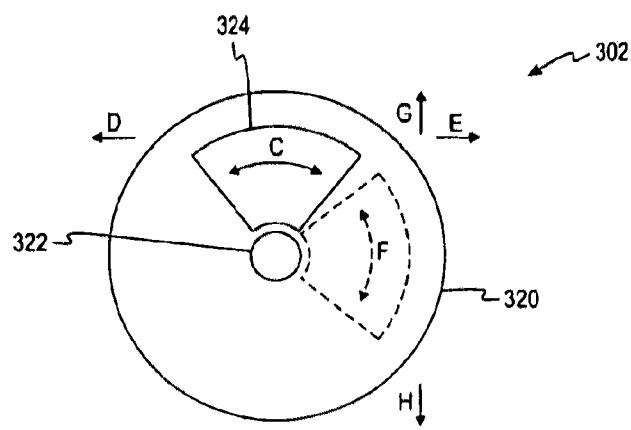
FIG. 3c is an illustration of a rotary actuator providing vibration transmissions in two directions.

FIG. 3c is a top cut-away illustration of the actuator 302 depicted in this illustrated embodiment as a rotary actuator having a housing 320, a shaft 322, and a slightly unbalanced mass 324 connected to the shaft 322. The mass 324 can be rotated back and forth along a small degree of rotation to produce vibration transmission along multiple axes in multiple directions depending upon the range of degrees of rotation. For example, the mass 324 can be rotated back and forth along arc C to produce vibrations in directions D and E. The mass 324 can be rotated about 90 degrees and then rapidly moved back and forth along arc F to produce movement in directions G and H.

Figure 4:
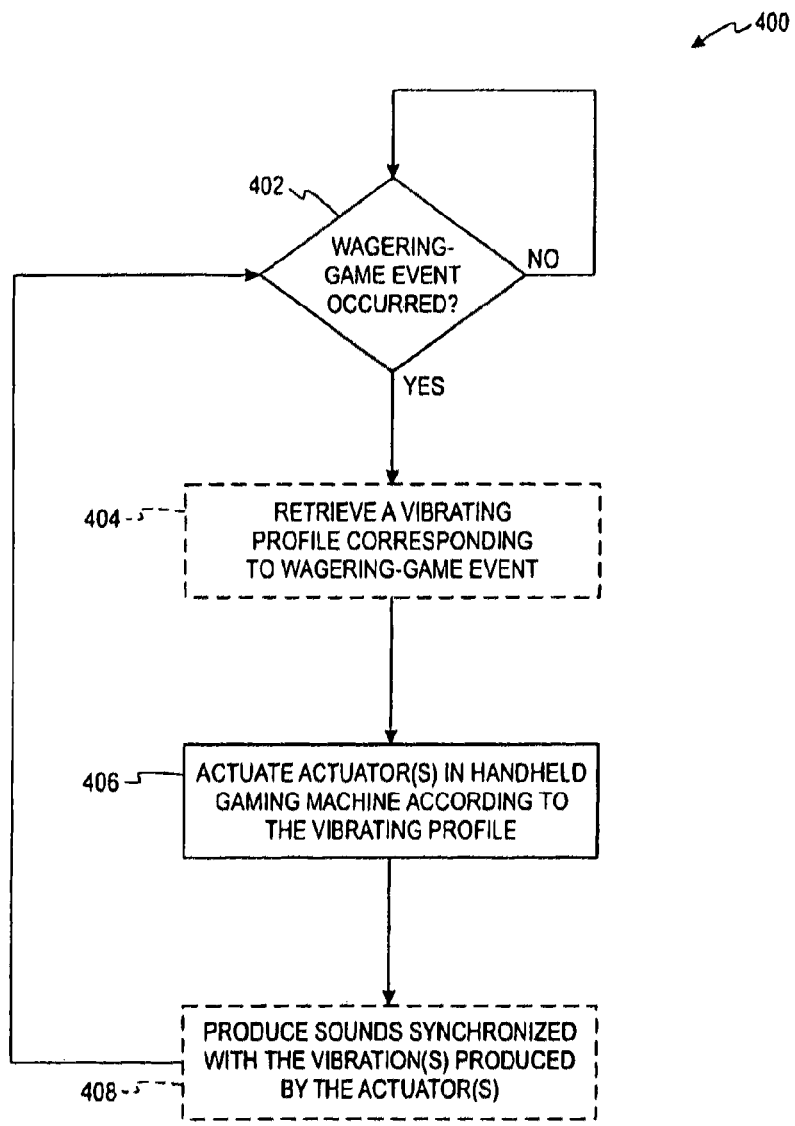
FIG. 4 is a flow chart depicting a method of actuating one or more actuators in a handheld gaming machine according to an aspect of the present invention.

FIG. 4 is a flow chart depicting a method 400 of actuating the actuators 302 of the handheld gaming machine 110 according to a specific embodiment of the present invention. The controller 34 polls whether a wagering-game event has occurred (402). An example of a wagering-game event is a change in game rules, an input of a wager, and the like. The change in game rules may include a change in the odds of winning an award during the wagering game, a change in wagering-game mode, a change in the type of award that can be awarded during the wagering game, change in eligibility for a bonus, or an accumulation or opportunity to accumulate one or more game elements associated with the wagering game. The vibration indicating, the change in game rules can be produced independent of changes between, normal and bonus game play, and is consistent with a theme of the wagering game. When a wagering-game event occurs, or is about to occur, the controller 34 may retrieve a vibrating profile corresponding to the wagering-game event from the memory 304 (404). As discussed above, the vibrating profile may also be stored in the form of a formula. The actuators 302 are actuated in the handheld gaming machine 110 according to the vibrating profile retrieved from the memory 304 (406). Optionally, the controller 34 may cause sounds to be produced, which are synchronized with the vibrations produced by the actuators 302.

In some embodiments, the vibrational cue or feedback can be consistent with a theme of the wagering game. For example, in a fishing-themed game, the vibration can simulate the "feel" of a reel of a fishing rod as the reel is wound. Sounds consistent with the sound of a winding reel can accompany the vibration to further enhance the wagering-game experience. Other wagering-game themed vibrational cues or feedback include vibrations caused by frogs croaking, vibrations of a running boat motor, or vibrations caused by thunder or a herd of stampeding animals to create suspense and to indicate that the rules of the wagering game have changed or are about to change. The examples provided herein are by no means exhaustive and are intended to be exemplary only.

By way of another example, in a reel-themed game, as the reels are spinning, one or more vibrating profiles (for example, at least five vibrating profiles, one for each of five reels) can be applied to the actuators 302 to create the haptic sensation of vibrations caused by spinning reels. As the reels slow down and come to a stop (sometimes accompanied by a "ka-chunk" sound), the vibrating profile can be adjusted to decrease the amplitude of the vibrations. Each "ka-chunk" sound of a stopping reel can be synchronized with a vibrating profile that generates a "ka-chunk" sensation. In embodiments having more than one actuator, a haptic "stereo" effect can be created wherein the vibrations begin on the left side of the handheld gaming machine 110, and as each reel from left to right come to a stop, the vibrational cues appear to "follow" the stopping reels from left to right. In noisy environments where the player may have to strain to hear audio sounds outputted by the speakers 117, the actuators 302 can provide vibrational cues and feedback to the player as a substitute or as an enhancement to the audio cues or feedback outputted by the speakers 117. Examples of haptic or tactile stereo effects are discussed in more detail in connection with FIGS. 6*a* and 6*b* below.

In a further example, in a poker game, each time a card is turned over or placed on the virtual poker table, a vibrational cue is produced by the actuators 302 to simulate the feel of a card being flipped or placed onto a table. Or, when cards are being shuffled, a vibrating profile simulating a card-shuffling vibration can be produced by the actuators 302 under control of the controller 34. In a still further example, during a roulette game, as the ball tumbles about the periphery of a roulette wheel, each tumble can be tracked by way of a vibrating profile such that the player "feels" each interaction between the ball and the roulette wheel before coming to a rest. Likewise, the spinning of the roulette wheel can be simulated using a "clicking" profile where each click represents a rotational movement of the roulette wheel. The clicking profile can also appear to move in a circular manner about the surface of the casing 112 of the handheld gaming machine 110 as it is held by the player. The vibrational cues and feedback produced by the actuators 302 creates a more realistic environment, and the player has the perception that the wagering-game elements displayed on the displays 114, 116 are physical objects.

In still further examples, a change in the odds of winning can be indicated by applying a vibrating profile that gradually increases or decreases in intensity to indicate whether the odds have been increased or decreased, respectively. A change in the type of an award can be indicated by applying to the actuators 302 a vibrating profile that is consistent with the type of award being changed. For example, if the type of award doubles in value, a vibrating profile having two distinct vibrations can be applied to the actuators 302 to indicate a doubling of a potential award. A change in the eligibility for a bonus can be indicated by applying a vibrating profile to the actuators 302 consistent with the bonus for which the player is eligible to win.

Note that the vibrating profiles herein can be adapted to match the amplitude and frequency spectrum of the audio being played on the handheld gaming machine 110. In other words, the low-frequency portions of the audio can be tracked by vibrations that match in amplitude the frequency value of the audio being played. This could simulate the vibrations caused by a drum instrument, for example, or could be used to produce a "bass shaker" effect on the handheld gaming machine 110. Any sound effect played through the speakers 117 can be synchronized with vibrations produced by the actuators 302, which mimic the sound amplitude and sound patterns by varying the vibration pattern, amplitude, and duration accordingly.

FIGS. 5*a*-1 and 5*b* are functional block diagrams of two different embodiments of the handheld gaming machine having two and four actuators, respectively, according to embodiments of the present invention. In FIG. 5*a*-1, the handheld gaming machine 110 includes a left actuator 502 and a right actuator 504 situated near the left side and right side, respectively, of the handheld gaming machine 110. The actuators 502, 504 can be incorporated into or positioned near the speakers 117 of the handheld gaming machine 110, and are preferably mounted to the housing or casing 112 of the handheld gaming machine 110 so that vibrations from the actuators 502, 504 are transmitted to the casing 112. The positioning of the actuators 502, 504 creates a "stereo haptic" effect, which can be actuated independently to create vibrational cues and feedback that are sensed by different parts of the player's body, for example, by the left and right hands on by the left and right thighs of a player's lap. Moreover, the actuators 502, 504 can be actuated according to respective vibrating profiles so that the player perceives that the vibrational cue or feedback emanates from a specific point relative to the handheld gaming machine, which may not be directly proximate the actuators 502, 504 themselves. The principles governing this "trick" are similar to those used by stereo speakers to create the impression by the listener that the sound is emanating from a source different from the locations of the stereo speakers. The left and right ears of the listener perceive the incoming sounds at different times and possibly at different amplitudes, such that when the brain synthesizes and processes the incoming sounds, it extrapolates and averages the location of the combined sounds. Other tricks of the mind can be played on the eyes. A phenomenon referred to as persistence of vision or disambiguation holds that images can "linger" in the brain for a fraction of time. For example, that a rapidly spinning fan appears to be standing still or rotating very slowly can be attributed to the persistence of vision phenomenon. In an analogous manner, a player's haptic senses can be manipulated so that a vibrational cue or feedback appears to emanate from a source different from the actual physical location of the actuators.

FIG. 5a-2 is a curve showing the respective amplitudes of vibrations produced by the left actuator 502 and the right actuator 504 plotted against the position along the length of the handheld gaming machine 110. The left amplitude is smaller than the right amplitude. Although each vibration is separately produced, the player's body perceives a single vibration that represents the average of the two separate vibrations, shown in FIG. 5a-3. Thus, the combined vibration shown in FIG. 5a-3 appears to the player to emanate from a position in between the physical locations of the actuators 502, 504.

FIG. 5a-4 are two curves of the left actuator 502 and the right actuator 504, respectively, where the left actuator 502 vibrates at a frequency that is out-of-phase with the frequency at which the right actuator 504 vibrates. The right actuator 504 also starts vibrating a time period after the left actuator 502 begins to vibrate. By delaying the start times of the actuators 502, 504, a perception that a vibration is moving across the handheld gaming machine 110 is created. Additionally (as shown in FIG. 5a-4) or alternately, the phases of the frequencies at which the actuators 502, 504 can be varied to create the same moving effect.

In FIG. 5b, four actuators 506, 508, 510, 512 are disposed near the top-left, top-right, bottom-left, and bottom-right corners of the handheld gaming device 110 according to an embodiment of the present invention, and are preferably mounted to the casing 112 of the handheld gaming machine. Applying the "persistence of touch" principles elucidated above, a vibrational cue or feedback can be made to appear to emanate from virtually any point on the handheld gaming device 110, by varying the patterns, intensities, durations, and frequency components of vibrating profiles associated with each actuator 506, 508, 510, 512. These vibrating profiles can be dynamically adjusted in response to and as a function of environmental characteristics sensed by the sensor(s) 306.

FIG. 5c is a front cut-away view of the casing 112 of the handheld gaming machine 110 shown in FIG. 1b with left and right rotatable actuators 502, 504. Each actuator 502, 504 is mounted to the casing 112 of the handheld so as to transmit vibrations to the casing 112 and thereby to the player's body, and is rotatable under control of a controller, such as the controller 34, about an axis lying in three-dimensional space such that the range of rotational motion approximates a sphere. Vibrating profiles associated with each such rotating actuator 502, 504 may also include information representing the three-dimensional rotational angle of the actuators 502, 504 relative to their respective rotating points. The rotating actuators 502, 504 further enhance haptic directionality in that the vibration energy can be transmitted in any direction, creating moving sensations, for example. For example, a twisting effect can be achieved by rotating the actuators 502, 504 in directions away from one another as they are generating vibration transmissions. Through the player's lap or hands, the player perceives that the entire handheld gaming machine 110 appears to be twisting away from the player. Other moving haptic effects can be created, such as creating the effect that a vibration is moving from the bottom of the handheld gaming machine 110 towards the primary display 112 or vice versa. For example, the impacts of the thundering hooves of a stampede of cows can be simulated by transmitting vibrations from the surface of the primary display 112 toward the bottom 520 of the casing 112. Each such transmission creates the sensation on the player's lap that the cow's hooves are actually impacting the handheld gaming machine 110.

Figure 5D:
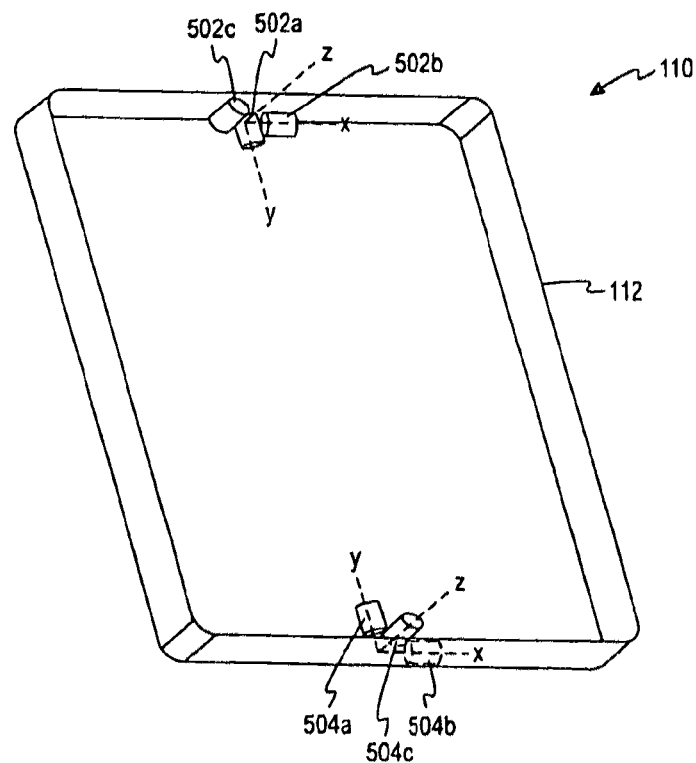
FIG. 5d is a perspective view of a cluster of three actuators positioned to transmit vibrations along an x-axis, y-axis, and z-axis, respectively.
Figure 6A:
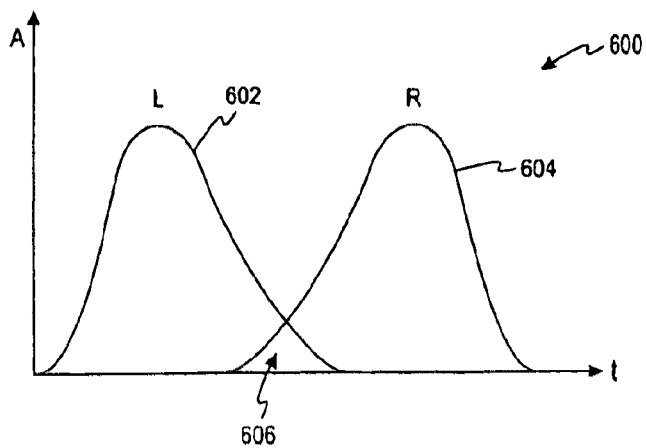
FIG. 6a is a vibrating-profile chart of a left actuator and a right actuator of a handheld gaming machine according to an aspect of the present invention.
Figure 6B:
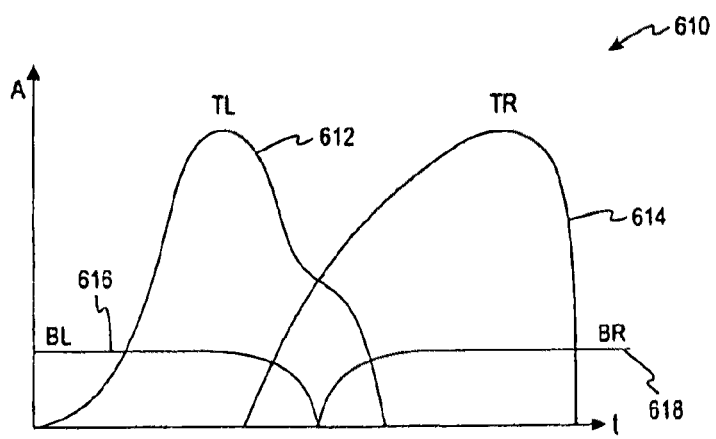
FIG. 6b is a vibrating-profile chart of four actuators of a handheld gaming machine according to another aspect of the present invention.

FIG. 5d illustrates a different embodiment of multi-axis actuator directionality. The actuator 502 includes three fixed actuators 502a, 502b, 502c mounted on the casing 112, positioned to generate vibrations along generally an x-axis, y-axis, and z-axis, respectively. Each actuator 502a, 502b, 502c can actuate according to its own vibrating profile to create a three-dimensional haptic effect as described above in connection with FIG. 5c.

FIGS. 6a and 6b are curves of exemplary vibrating profiles according to specific embodiments of the present invention. In FIG. 6a, a vibrating profile 600 includes a vibrating profile 602 for the left actuator 502 shown in FIG. 5a and a vibrating profile 604 for the right actuator 504. Each vibrating profile has a pattern (in the illustrated embodiment, the pattern resembles a sudden increase in vibration amplitude followed by a sudden decrease), an amplitude profile, and a duration, and may also include information representing an axis in three-dimensional space along which the rotatable actuator 502, 504 is positioned. The two vibrating profiles 602, 604 overlap during time period 606, creating a stereo haptic effect wherein two distant actuators are vibrating simultaneously, at the same frequency (in-phase) or at different frequencies (out-of-phase). The player perceives the average of the vibrations emanating from each actuator 502, 504, creating the perception that the vibration is actually emanating from a point different from the locations of the actuators 502, 504 or that the vibration is "moving." The vibrating profile 600 shown in FIG. 6a may be suitable, for example, to simulate the sensation of spinning of reels stopping in left-to-right order.

In FIG. 6b, an exemplary vibrating profile 610 includes a vibrating profile 612 for the top-left actuator 506 shown in FIG. 5b (represented by curve TL), a vibrating profile 614 for the top-right actuator 508 (represented by curve TR), a vibrating profile 616 for the bottom-left actuator 510 (represented by curve BL), and a vibrating profile 618 for the bottom-right actuator 512 (represented by curve BR). Each vibrating profile 612, 614, 616, 618 is unique from one another (although in other embodiments some or all of the vibrating profiles may be identical). Multiple vibrating profiles can overlap during any given time period to generate a "surround" haptic effect. Other effects can be generated by different vibrating profiles. For example, the top-left actuator can be actuated according to a vibrating profile for a brief period of time, turned off, and then the top-right actuator can be actuated then turned off, followed by the bottom-right actuator, then finally the bottom-left actuator. This process can be repeated very rapidly to create the sensation of a circular movement relative to the handheld gaming machine 110. For example, in a roulette wagering game, as a roulette wheel is spinning, the spinning motion can be tracked by the successive actuation of the four actuators 506, 508, 512, 510, in that order (to simulate clockwise spinning). Each vibrating profile can include multiple frequency components where one of the frequency components simulates the spinning movement and other frequency components simulate the ball tumbling about the periphery of the roulette wheel as it is spinning. Still other frequency components can track the audio sound played through the speakers 117 of the handheld gaming machine 110 as described above. Low frequency components can track the bass track of a game sound theme of the wagering game being played on the handheld gaming machine 110.

Figure 7A:
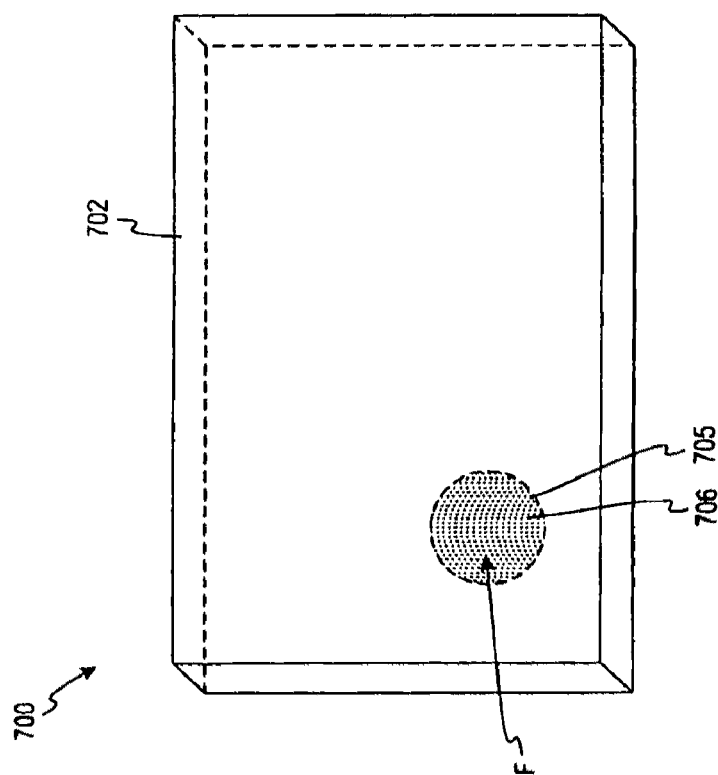
FIGS. 7a and 7b-c are, respectively, isometric and frontal illustrations of haptic displays in accord with some aspects of the present invention.

As explained above, in some embodiments, the actuator 302 includes a haptic device. FIG. 7a is an isometric illustration of a haptic device 700 of the actuator 302 suitable for the handheld gaming machine 110. The haptic device 700 includes a haptic touch screen and an associated touch screen controller, software or host application, and a haptic controller. When the user of the gaming terminal touches the hard surface of the touch screen display 702, as represented by the force arrow F in FIG. 7(a) directed toward a graphical button 705, the graphical button will be displayed to depress and release. This effect, the perception of pressing physical switches, is created by piezoelectric elements (e.g., comprising transparent quartz) which vibrate in various modes. In the piezoelectric effect, an electric field set up in a suitable material by a voltage applied to two electrodes on its surface, causes a dimensional change of the material. The dimensional change may be used to create a vibration pulse(s), represented by the reference numeral 706 and associated graphic.

The haptic device 700 may comprise any of various types of touchscreen displays, including capacitive, resistive, surface acoustic wave (SAW) and infrared. The vibratory response of the piezoelectric elements may further be synchronized with the handheld gaming machine speakers 117 and/or display(s) 114, 116 to enhance the overall perception that a physical button has been depressed and/or released through all of or part of an apparent range of motion of the graphical button 705.

Figure 7C:
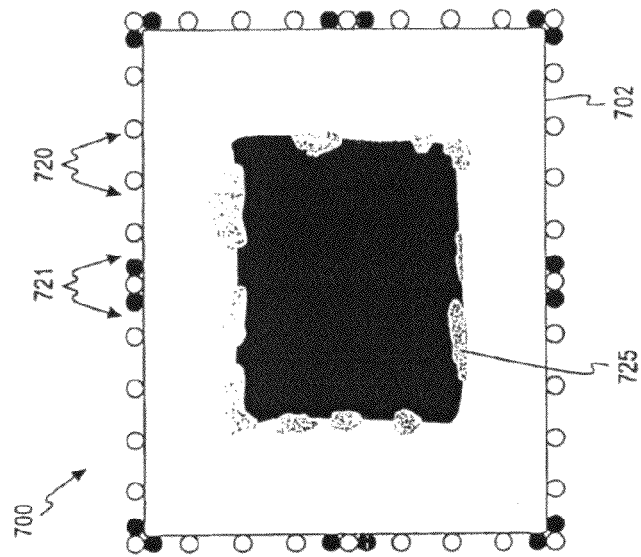
Figure 7B:
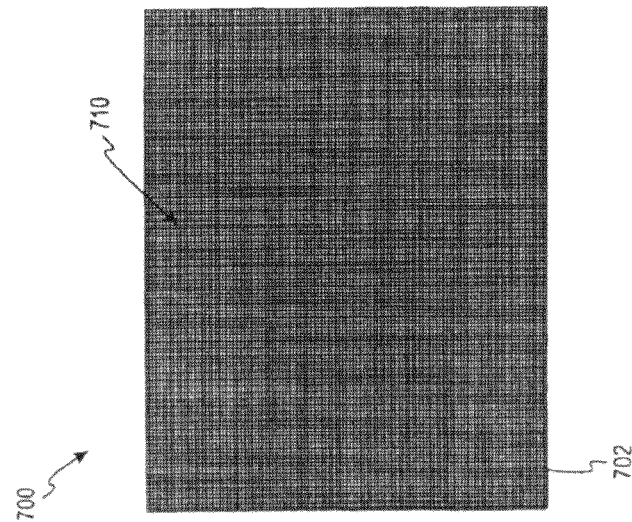

Other configurations and types of haptic devices 700 (e.g., haptic displays, interfaces and/or controllers) may include, for example, a display substrate 702 having an array 710 comprising conductive elements, electrodes, switching elements, and/or piezoelectric elements disposed thereover, such as shown in FIG. 7(b). In another example, a haptic device 700 may comprise a display substrate 702 having a plurality of piezoelectric elements 720 situated about a periphery of the display substrate 702 so as to provide peripheral vibration nodes, such as shown in FIG. 7(c). Suitable piezoelectric elements include a transparent quartz, a transparent ceramic material such as lanthanum-doped lead zirconate-titanate (PZT or PLZT), or an artificial polycrystalline ferroelectric material.

These piezoelectric elements 720 may be used in various combinations, frequencies, and amplitudes to influence a resulting output at a specific point or region of the display, such as point 725 shown in the center of the display 700. In one aspect, the vibration at each specific point or region of the display resulting from a specific combination of outputs from one or more piezoelectric elements 720, and any applicable damping elements 721, may be mapped and stored in a memory device, such as the memory 304 shown in FIG. 3a. The piezoelectric elements 720 may therefore be used, singularly or in combination, to introduce pulses and/or standing waves within a desired portion of the display substrate 702 or display-element attached thereto. Active damping elements 721 may also be provided about the periphery of the haptic display 700, such as shown in FIG. 7(c), to attenuate the influence of reflected waveforms/vibrations and to permit further control of the vibrations present at any selected portion of the display.

The haptic devices 700 in accord with the present concepts may also comprise piezoelectric transducers 720, or other types of transducers, having a slightly concave transmitting face to generate a concave wavefront providing some degree of focusing or directionality in the applied vibration. Adjacent transducers used in the haptic interface, such as piezoelectric elements 720 in FIG. 7(c), may be selectively ganged or linked for pulsing at a common frequency so as to generate a wavefront that is substantially planar and parallel to the axis of the transducers. If, however, the transducer excitation pulses are successively delayed between successive adjacent transducers, a wavefront at an angle to the axis of the transducers may be generated. Similarly, the timing of the excitation of the various transducers may be selected so as to generate other types of waveforms (e.g., concave, convex).

Figure 8A:
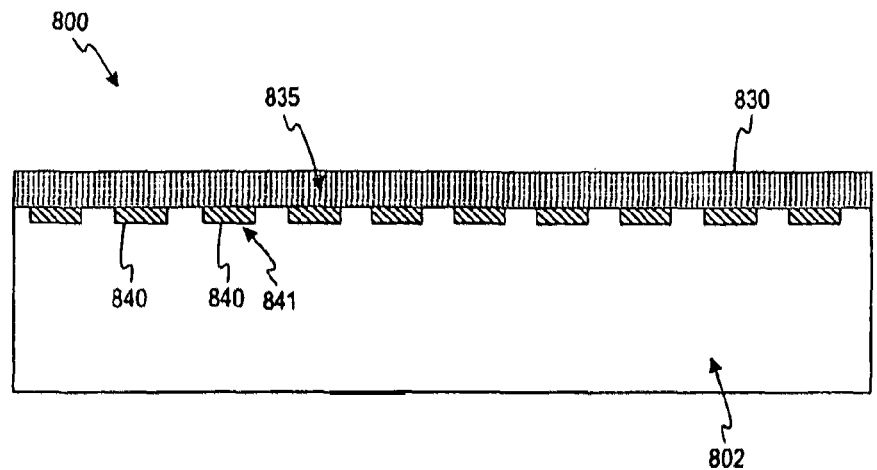
FIGS. 8a-b are cross-sectional views of haptic displays according to some aspects of the present invention.
Figure 8B:
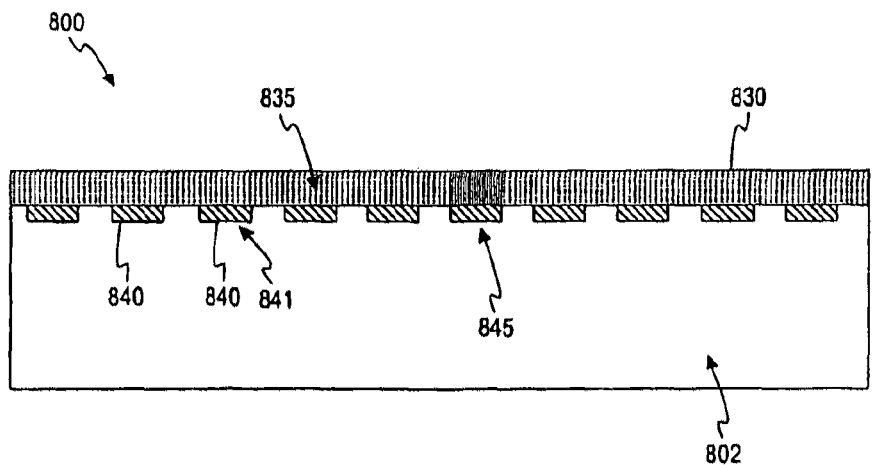

The present concepts are not limited to piezoelectric-element 720 haptic devices or audio-based devices and may embrace any mechanism by which rapid changes in the physical state of the display or other output device may be effected through changes in a variable such as, but not limited to, temperature, electric field, or magnetic field. The haptic device 700 can even include one or more devices configured to blow air and/or puffs of air on or toward a player of the gaming machine to create the sensation of wind or a pressure wave (e.g., an explosion, such as fireworks). The handheld gaining machine 110 and/or haptic device 700 (e.g., haptic display) itself may include thermal, electrical and/or magnetic sources configured to bring about rapid localized environmental changes to utilize materials exhibiting such rapid state changes, some of which are noted below by way of example. Electrical and magnetic fields may be generated, for example, by conductors incorporated into the display, attached to the display, or provided within a sheet, film or coating applied to the display. A representation of conductive elements 840 disposed within channels 841 formed on a front side of a display substrate 802 of a haptic device 800 is shown in FIGS. 8(a)-(b).

Electrodes and conductors 840 suitable for application to a display surface of a haptic display may comprise materials such as, but not limited to, Indium Tin Oxide (ITO), which are conventionally used as transparent conductors and electrodes.

Rheological fluids can change state instantly through the application of an electric (i.e., electrorheological) or magnetic (i.e., magnetorheological) charge. In one example, a display in accord with the present concepts could utilize a thin layer of a transparent rheological fluid 835 (i.e., liquid or gas); such as shown in FIGS. 8(a)-(b), compartmentalized within a resilient housing 830. The housing 830 is transparent or semi-transparent and at least somewhat flexible at least on the side of the housing 830 facing a user of the handheld gaming machine 110. In response to an increased localized electric field and/or magnetic field from a source appropriate to the particular rheological fluid, such as conductor 840, the rheological fluid would change state (e.g., soft to firm or hard), such as represented in FIG. 8(b), to provide a different tactile sensation (i.e., harder) than in the equilibrium state. For example, the change in state can provide an intelligible communication. This may serve, in one aspect, to assist blind and visually impaired persons in the enjoyment of the gaming machine experience by providing a physical representation of a displayed outcome (e.g., a "7, 7, 7" on a reel-based display). The housing 830 may alternatively have another type of carrier, such as a suspension of non-colloidal, magnetically-polarizable particles in a non-magnetic medium such as silica gel, disposed therein.

Thermoresponsive materials, such as shape memory alloys (SMAs) may also be used to create a haptic interface or device 800. Micro polymer gels comprising cross-linked polymer networks inflated with a solvent (e.g., water) can also be used in accord with the present concepts. These gels reversibly swell or shrink in response to small changes in temperature or electric field. Micro-sized gel fibers can contract in milliseconds and can deliver sizable stress, approximately equal to human muscle fibers. Dielectric elastomers (electrostrictive polymers) exhibiting a mechanical strain when subjected to an electric field may also be used and provide a striction capability significantly higher than that of piezoceramic materials. In an electric field, the elastomer expands in the plane of the electrodes. Magnetostrictor materials, wet electroactive polymers, and conductive polymers may, also be used.

In another example of the present concepts, the haptic device (e.g., haptic display) may include a heating sensation or effect. In one example, a thin transparent layer of a material, such as ITO, readily excitable by high-frequency vibration may be integrated with an outer surface of the display and/or provided in a transparent thin film or transparent housing attached to an outer surface of the display. Upon exposure to high-frequency vibration (e.g., piezoelectric elements 720), the material is excited to generate heat. The power level and duration of the heating could be controlled to provide no more than a slight, but nonetheless noticeable warming of a desired portion of the haptic device 700, 800. Devices other than piezoelectric elements, such as those formed within array 710, may also be used to generate points of localized heat on the display including, but not limited to, transparent resistance heating elements (e.g., transparent electrodes) integrated into the display surface or photonic (e.g., light-based, IR, UV) heating elements. A thermoelectric heating and/or cooling device, such as those provided by Marlow Industries of Dallas, Tex., may be utilized.

In accord with at least some aspects of the present concepts, wagering games or game features may utilize haptic devices 700, 800 as a part of game play or as an adjunct thereto to entertain a user. Although one user interface includes a tactile touch screen comprising a piezoelectric elements (e.g., array 710), other forms of haptic devices or interfaces may also be integrated into the wagering game experience. For example, game features may, in accord with the present concepts, also or alternatively utilize other one or more other types of haptic devices such as, but not limited to, a haptic pen, button, joystick, mouse, finger(s), helmet, suit, vest, belt, boot, seat, or glove, as may be conventionally available or as further developed henceforth.

An example of a game feature advantageously utilizing haptic technology includes a treasure hunting game in which players attempt to find hidden articles by means of a series of clues, players may be presented by a picking game, maze, or puzzle in which the player much make a choice or a series of choices, such as by selecting one or more icons or selectable elements. In one aspect, the player may further be invited or prompted to touch the display to gain additional input or clues from the handheld gaming machine 110 prior to selection of an icon or other selectable element. In another aspect, the player may be invited to scan the screen searching for tactically-based awards or objects. For example, a player may be given a predetermined period of time, such as five seconds, to find a designated area of the screen containing a hot spot representing a game advancing outcome (e.g., finding a hidden door in a maze). Clues may be provided to the player, through any combination of a visual, auditory, and tactile output, to guide or assist the player. For example, a player attempting to find a hidden object by touching his or her finger to the display may be given feedback by the controller 34. As the player gets closer to his or her award, he or she may experience vibration of increasing frequency and/or amplitude and, correspondingly, as the player gets farther away from the award, he or she may experience vibration of decreasing frequency and/or amplitude. To make such aspects of the wagering game even more challenging, the game might even optionally include misdirectors or visual, auditory, and/or tactile clues intended to confuse and/or overwhelm the player's senses and thereby make the player's task more challenging, and potentially more rewarding (e.g., 2× increase for one level of misdirection, 4× for two levels of misdirection).

In an example, a player pick of a selectable element corresponding to a winning outcome or correct choice may result in the output of a low-frequency constant or pulsating vibration through an appropriate haptic device 700, 800 (e.g., display, pen, joystick, mouse, seat, finger, glove, etc.), whereas a player pick of a non-winning outcome or an incorrect choice may result in the output of a high-frequency constant or pulsating vibration. Separate haptic outputs may be assigned to each selectable element or to groupings of selectable elements, such as for a first group of responses which benefit the player by advancing play or increasing an award and a second group of responses which would not yield such benefit. In another aspect, when a player is presented with a plurality of user-selectable elements, a haptic output may not be assigned to or associated with a second user-selectable element until a first user-selectable element has been selected or until another game play condition has been satisfied. Thus, in a card picking game where a player is challenged to match a first selected card (e.g., a King of Hearts) with another like card (i.e., another King), the selection of the first selected card causes the controller 34 to associate a "correct" haptic response, such as a low frequency pulsating vibration, with one of the three remaining Kings and to associate an "incorrect" haptic response, such as a high frequency constant vibration, with the remaining cards.

The gaming machine(s), system(s), and method(s) disclosed herein thus include the ability to link multiple buttons, icons, or portions of the display to work in combination with each other. The present concepts also include the ability to associate buttons, icons, or portions of the display to provide different outputs based on previous or concurrent player inputs and/or controller instructions in response to game states arising during game play. For example, where an array of selectable elements are presented on the display, one button touched in isolation might not provide any tactile sensation, or might provide a first tactile sensation, whereas two buttons touched in combination might provide a distinct second tactile sensation (e.g., signifying a beneficial outcome) or a distinct third tactile sensation (e.g., signifying a losing outcome).

A haptic device 700, 800 may also include a haptic display functionally mated with wagering games involving sporting themes or shooting themes in accord with the present concepts. One sensory perception associated with games such as pinball, golf, or shooting (e.g., slingshot, bows) relates to resistance (i.e., a force which tends to oppose or retard motion). In a pinball/pachinko implementation of the present concepts, the player may continuously press an on-screen icon simulating a plunger on a traditional pinball/pachinko machine. This would build or increase the apparent resistance of the simulated plunger, such as by increasing the frequency and/or amplitude of the vibration in the area of the plunger, until the player releases the icon, sending the ball into play, or reaches the limit of the plunger travel. In another example, players can enter a simulated golf range wherein the player may be prompted to press an on-screen icon that simulates the backward swing of a golf club by building the apparent resistance of the golf club as it is drawn backward and upward until the player releases the icon, sending the golf ball onto the fairway, or reaches the upward extent of the golf club travel.

In yet another example, the gaming machine may present on the display a shooting gallery wherein the player is given, or is given the option to select from, a shooting device. Conceptually, the player would continuously press an on-screen icon which would provide a substantially continuously increasing resistance until the player releases the icon to shoot the shooting device. The shooting device could comprise, for example, a slingshot or bow which is a resistance based shooting device. In another aspect, however, the shooting device could comprise a gun and the gun trigger may be configured with to output an increasing resistance until a certain limit (e.g., a sweet spot) is reached, at which point the gun discharges and the resistance drops off abruptly. In another aspect, since it may be desired to "hold" the trigger at a set resistance (i.e., just below the sweet spot) until a target comes into range or comes within the sight of the gun, the on-screen icon associated with the gun trigger may be functionally linked to a second on-screen icon that a player could manipulate with another finger. For example, such a second on-screen icon could comprise a trigger lock that would stop the increasing output of the gun trigger on-screen icon at the desired limit until the trigger lock is removed, such as by removing the finger contacting the second on-screen icon. In each of these examples, the resistance is linked to the visual presentation of the object of interest (e.g., pinball plunger, golf club, bow string, slingshot band, gun trigger, etc.) so as to at least substantially synchronize the gaming machines visual and tactile sensory output. To further layer the sensory output available to enhance the player's gaming experience, gaming machines in accord with the present concepts may further synchronize auditory output with the visual and tactile outputs.

The on-screen icons could comprise, for example, a simulated button, slider, band, rotatable switch, or rotary dial. A plurality of such on-screen icons may be linked or ganged together competitively (i.e., to work in opposition) or cooperatively (i.e., to work together). An example of the competitive use of on-screen icons was presented above with regard to the gun trigger and the trigger lock. For cooperative linkage of on-screen icons, one example could include a player attempting to open a treasure chest with a heavy lid using a plurality of icons situated on the treasure chest to correspond to a placement of the players fingers. As the player attempts to open the treasure chest, the simulated resistance would be initially high and would decrease substantially uniformly across all of the on-screen icons as the treasure chest lid opens far enough to begin transferring some of the weight of the lid to the hinges connecting the lid to the treasure chest. It is to be noted that the actual use of icons as a visual aid is entirely optional. The functionality of the tactile touch screen in accord with the present concepts is in no way limited to the use of visual queues or clues. For example, the player may be prompted simply to put his or her fingers on the lid of the treasure chest and to move his or her fingers upwardly against the resistance to open the treasure chest. The gaming machine would be configured to provide a similar sensory feedback along the edges and regions of the displayed treasure chest lid.

Another aspect of wagering game play in accord with the present concepts includes a "click and drag" game feature. The clicking sensation is traditionally associated with a feeling of depressing a button and feeling a counteracting spring force from a spring positioned beneath the button surface. In accord with gaming machines embodying the present concepts, players may not only click on an icon, button, or object, but they may move the icon, button, or object about the screen, with an accompanying haptic response such as, for example, a pulsing vibration, a constant vibration, or bumps. The click and drag feature may, however, be provided independently of the haptic features disclosed herein.

In one aspect of the "click and drag" game feature, a player may be required to "capture" items and move them from one location in the game space to another location in the game space, preferably under a time constraint. If successful, the player may receive or qualify for an award, which may optionally be related to the amount of time that was required for the player to accomplish the task and/or that is related to the number of objects moved (e.g., higher awards for faster times and/or higher awards for greater numbers of objects moved). The gaming machine may be configured to provide a tactile output representing the capture of the selected item and this would continue as the player moves the selected item across the screen and would continue until the player releases the on-screen icon. Release of the on-screen icon "deposits" the item into its new location. An additional sensation can optionally be utilized to simulate the deposit or imminent release of the selected item. As noted above, an on-screen icon is optional. The displayed item itself, and on-screen location thereof, may be configured to provide the tactile sensory feedback. This feedback would thus dynamically reposition itself or "travel" as a player moves the selected item across the display. This feature further integrates the player into the realm of the game space by providing a more direct connection between the player and the manipulated object than is possible through traditional game play interfaces (i.e., icons, buttons, controls, etc.).

The present concepts are also extendable to permit representations of power level. Power levels also relate to increasing intensity (e.g., the amount or degree of strength of electricity, heat, light, etc.). As it relates to tactile touch screen technology and gaming, players may be permitted to enter, for example, a picking game whereby matches result in sensations such as described above, but the sensations increase in intensity depending upon the size of the award. For example, a match of three 5× multiplier symbols has a greater intensity than a match of three 2× symbols.

In another aspect of wagering game play which may take advantage of haptic devices 700, 800, haptic gloves or tools may be used to manipulate objects within the game space. Haptic gloves are conventionally provided with vibrating piezo-electric elements and/or pneumatic channels, pockets, or bladders which may be filled with pressurized air so as to press against the user's hand with varying degrees of force. In one aspect, the haptic glove may be instrumented or monitored to determine the position of and movement of predetermined points on the glove in space. The positions of these predetermined points would be translated to corresponding positions associated with an icon or image of a hand that would mirror the movement of the user's hand in 3-D. A player of a wagering game may thus be challenged to move the haptic glove or tool to move the corresponding virtual hand or tool within a 2-D or 3-D game space.

Wagering games in accord with the present concepts may therefore include game features utilizing haptic devices 700, 800, such as the virtual glove or tool (e.g., a pointed stick). For example, the user may be instructed to use the virtual glove or tool (i.e., by manipulation of the haptic glove or haptic tool) to pop rising or falling balloons. The popping of the balloons may be simulated, in one aspect, by gentle pressure waves being output by the haptic glove traveling from the point of the glove closest to the source (i.e., the popping balloon) to the point of the glove furthest from the source. In a game feature wherein a player is instructed to diffuse a bomb before a timer runs out, for example, an incorrect action or selection could activate both a piezo-electric element in a palm of the glove as well as all of the air pockets in the palm and fingers of the glove, concurrent with an output from the speakers 117. In short, plural haptic devices may optionally be used in combination in accord with any particular game content to provide tactile input to the user and thereby enhance the user/machine interface.

In still another aspect of game play in accord with the present concepts, a plurality of lottery game ticket scratch-off surfaces may be presented on a display. The user may be instructed to "scratch off" the scratch-off surfaces using either a haptic display or another non-display based haptic device, such as a haptic glove, mouse, pen or tool. When the user "scratches" within the confines of the displayed scratch-off surfaces, the user will receive feedback (e.g., vibration) through the selected or provided haptic interface. In one aspect, the feedback could comprise a feeling of substantially continuous roughness/resistance from the portions of the scratch-off surface which remain with no such roughness/resistance from the portions of the scratch-off surface which have been removed.

In at least some embodiments, a small video reel may be provided beneath a moveable display screen or haptic display 700, 800 wherein a user interfacing with the video reel (e.g., spinning or moving the reel) will result in a haptic output producing a sensation of clicking through different detents on the reel.

Thus, in at least some aspects of the present concepts, a wagering game for a gaming machine comprises instructions configured, upon processing by a processor, to perform various process steps leading to a haptic output to a user of the gaming machine. Where the haptic output is to be linked to an overall wagering game outcome, the instructions might cause the processor to associate each potential game element outcome with one particular output signal, out of a range of possible output signals, to a haptic device. Once the processor determines a wagering game outcome by comparing a set of game element outcomes to an award schedule, the processor would then output the output signal to the haptic device corresponding to a wagering game outcome to activate the haptic device in response thereto.

The haptic output may also be linked generally to a game feature, which may or may not be related to any specific wagering game outcome or game element outcome. For example, the game feature may announce entry into or qualification for a bonus round or special event based on a game outcome or game element outcome in the wagering game. In another example, the game feature may be initiated by a controller inviting a player of a gaining machine to join a group game based on a determination of the gaming machines' eligibility such as, but not limited to, satisfaction of a coin-in rate or quantity requirement. Where the haptic output is linked generally to a game feature, the processor associates a game feature with an output signal to a haptic device and outputs an output signal to the haptic device substantially concurrent with an initiation of the game feature. The haptic device is then activated in response to the output signal.

Each of these embodiments and obvious variations thereof is contemplated as falling within the spirit and scope of the claimed invention, which is set forth in the following claims. Moreover, the present concepts apply not only to basic wagering games, but also to bonus games and any other type of wagering game or associated game.

In yet another embodiment, a gaming machine display is provided with display-integrated speakers. This embodiment may be separate from, or may be combined with, the above-mentioned gaming machine embodiments utilizing the haptic display and/or other haptic outputs.

In one aspect of a gaming machine display-integrated speaker, an liquid crystal display (LCD) for the handheld gaming machine 110 is provided with a "speaker on glass" such as by, for example, deposition of transparent conducing polymer electrodes on top of a piezoelectric polymer thin film (PVDF or copolymer of vinylidenecyanide and vinyl acetate (PVCN-VAc)). A transparent loudspeaker may also include that currently provided by Sharp and Semiconductor Energy Laboratory of Japan in which the LCD display substrate is a continuous-grain silicon provided with piezoelectric acoustic drivers and audio circuitry integrated therewith. The gaming machine display may utilize piezoelectric audio transducers based on flat-speaker technology of New Transducers (NXT) of England, which employs distributed-mode actuators (DMA) having piezoelectric drive elements disposed on the LCD substrate to vibrate the glass surface and produce sound. The LCD display is also provided with a shift register latch, D/A converter, analog input preamplifier, volume control, and power amplifier.

In at least one aspect, the gaming machine display may incorporate not one integrated speaker, but a plurality of smaller speakers (e.g., 4, 8, 24, 36, 49, 64) to provide not only improved localization of a sound, but to permit the sound to move around the display. In combination with the tactile stimulus noted above, the sound emitted from the display-based speaker(s) could move synchronously with the tactile stimulus. The display-integrated speaker may further be selectively employed to only cover certain frequencies within the audible range, such as to eliminate conventional high frequency speaker elements (i.e., tweeters), while retaining conventional low frequency speaker elements (e.g., subwoofer). Elimination of any of the current gaming machine surface mounted speakers in this manner will free up marked volumetric space within the gaming machine, simplify manufacturing complexity and cost, and reduce maintenance costs.

Moreover, the display-integrated speaker need not be integrated into the gaming machine primary display, but may be provided in one or more secondary displays or in glass panels provided on the display bearing game-related artwork (painted glass) or advertisements (e.g., to offset licensing fees), or the like. Further, the display-integrated speaker need not be paired with a tactile display. In one aspect of the present concepts, a gaming machine could be provided with a dual display, one display (e.g., a top display) having tactile or sensory feedback, the other display (e.g., a bottom display) having one or more integrated speakers.

The haptic device embodiments discussed in connection with FIGS. 7a-8b can be combined with the embodiments described in connection with FIGS. 5a-6b to provide tactile cues and feedback via the display 114 and via the casing 112. These embodiments may be accompanied by corresponding sounds transmitted by the speakers 117 and corresponding images displayed on the displays 114, 116 to provide a tri-sensory experience (sight, sound, touch) for the player.

Each of these embodiments and obvious variations thereof is contemplated as falling within the spirit and scope of the claimed invention, which is set forth in the following claims.

What is claimed is:

1. A handheld gaming machine, comprising:
   an input device configured to receive a wager to initiate a wagering game;
   a video display configured to display the wagering game on the handheld gaming machine;
   a first actuator and a second actuator positioned at opposite sides of the handheld gaming machine;

a memory storing a plurality of vibration profiles each representing a distinct combination of a vibration pattern, a vibration amplitude, or a vibration duration; and a controller coupled to the video display and to the first and second actuators, the controller programmed to cause the wagering game to be displayed on the video display and to cause, in response to an occurrence of a wagering game event, the first actuator to vibrate according to a first of the vibration profiles and the second actuator to vibrate according to a second of the vibration profiles to produce a vibration that represents an average of the vibrations produced by the first and second actuators and that is perceived tactilely by the player as emanating from a point between the first and second actuators.

2. The handheld gaming machine of claim 1, wherein the wagering-game event includes a change in game rules or the receipt of the wager by the input device.

3. The handheld gaming machine of claim 2, wherein the change in game rules comprises a change in the odds of winning an award during the wagering game.

4. The handheld gaming machine of claim 2, wherein the change in game rules comprises a change in the type of award that can be awarded during the wagering game.

5. The handheld gaming machine of claim 2, wherein the vibration indicating a change in game rules is produced independent of changes between normal game play and bonus round game play of the wagering game.

6. The handheld gaming machine of claim 2, wherein the change in game rules comprises eligibility for bonus play.

7. The handheld gaming machine of claim 2, wherein the change in game rules comprises eligibility to accumulate one or more game elements associated with the wagering game.

8. The handheld gaming machine of claim 1, wherein the vibration is consistent with a theme of the wagering game, and wherein the first vibration profile vibrates the first actuator at a frequency that is out-of-phase relative to a frequency at which the second vibration profile vibrates the second actuator to produce a sensation that the vibration is moving between the first and the second actuators, the controller being further programmed to cause a graphic related to the wagering game to be displayed on the video display that moves in a synchronous manner with the moving vibration across a surface of the video display.

9. The handheld gaming machine of claim 8, wherein the theme is part of a slot wagering game and the vibration is a series of vibrations that simulate the tactile sensation of multiple reels decelerating and coming to a stop.

10. The handheld gaming machine of claim 8, wherein the theme is part of a roulette wagering game and the vibration is a series of vibrations that simulate the tactile sensation of a spinning roulette wheel.

11. The handheld gaming machine of claim 8, wherein the theme is part of a card wagering game and the vibration simulates the tactile sensation of a card being placed upon a surface.

12. The handheld gaming machine of claim 1, wherein each of the firs and second actuators includes a haptic touch screen or an electromagnetic coil coupled to a movable mass.

13. The handheld gaming machine of claim 1, further comprising one or more speakers, and wherein the controller is further programmed to generate sounds through the one or more speakers, the sounds and the vibration being synchronized to indicate the wagering-game event.

14. The handheld gaming machine of claim 1, wherein the vibrating profile further includes information representing an axis of rotation of the first or the second actuator in three-dimensional space.

15. The handheld gaming machine of claim 1, wherein the vibration pattern includes multiple frequency components.

16. The handheld gaming machine of claim 15, wherein at least some of the multiple frequency components are out-of-phase relative to one another to create the perception that the vibration is moving between the first and the second actuators.

17. The handheld gaming machine of claim 1, further comprising a third actuator and a fourth actuator, wherein the first, second, third, and fourth actuators are positioned at respective corners of the handled gaming machine, and wherein the controller is further programmed to cause the third actuator to vibrate according to a third of the vibration profiles and the fourth actuator to vibrate according to a fourth of the vibration profiles to produce the vibration that is perceived by the player as emanating from any point between the first, second, third, and fourth actuators.

18. The handheld gaming machine of claim 17, wherein the four actuators are rotatable about an axis in three-dimensional space.

19. The handheld gaming machine of claim 1, wherein the first and second actuators are coupled to a housing of the handheld gaming machine proximate a first and a second speaker, respectively.

20. The handheld gaming machine of claim 1, further comprising a third actuator positioned along an axis that is different from the first and second actuators.

21. The handheld gaming machine of claim 1, wherein each of the first and second actuators includes a permanent magnet coupled to a movable mass.

22. A method of conducting a wagering game on a handheld gaming machine, the method comprising:

receiving a wager to initiate a wagering game;

displaying the wagering game on a video display of the handheld gaming machine;

storing in a memory of the handheld gaming machine a plurality of vibration profiles each representing a distinct combination of a vibration pattern, a vibration amplitude, or a vibration duration;

causing, using a controller, in response to an occurrence of a wagering game event, the first actuator to vibrate according to a first of the vibration profiles and the second actuator to vibrate according to a second of the vibration profiles to produce a vibration that represents an average of the vibrations produced by the first and second actuators and that is perceived tactilely by a player of the handheld gaming machine as emanating from a point between the first and second actuators.

23. The method of claim 22, wherein the wagering-game event includes a change in game rules.

24. The method of claim 23, wherein the change in game rules comprises a change in the odds of winning an award during the wagering game.

25. The method of claim 23, wherein the change in game rules comprises a change in the type of award that can be awarded during the wagering game.

26. The method of claim 23, wherein the vibration indicating a change in game rules is a vibration consistent with a theme of the wagering game.

27. The method of claim 23, wherein the vibration indicating a change in game rules is produced independent of changes between normal game play and bonus round game play of the wagering game.

28. The method of claim 23, wherein the change in game rules comprises eligibility for bonus play.

29. The method of claim 23, wherein the change in game rules comprises eligibility to accumulate one or more game elements associated with the wagering game.

30. The method of claim 22, further comprising generating sounds through one or more speakers on the handheld gaming machine, the sounds and the vibration being synchronized to indicate the wagering-game event.

31. The method of claim 22, wherein the first vibration profile vibrates the first actuator at a frequency that is out-of-phase relative to a frequency at which the second vibration profile vibrates the second actuator to produce a sensation that the vibration is moving between the first and the second actuators, the method further comprising causing, using the controller, a graphic related to the wagering game to be displayed on the video display that moves in a synchronous manner with the moving vibration across a surface of the video display.

32. The method of claim 22, wherein the wagering-game event includes the receipt of the wager by the input device.

33. A computer readable storage medium encoded with instructions for directing a handheld gaming machine to perform the method of claim 22.

* * * * *

UNITED STATES PATENT AND TRADEMARK OFFICE
CERTIFICATE OF CORRECTION

| | |
|---|---|
| PATENT NO. | : 8,210,942 B2 |
| APPLICATION NO. | : 12/225342 |
| DATED | : July 3, 2012 |
| INVENTOR(S) | : Jorge L. Shimabukuro et al. |

It is certified that error appears in the above-identified patent and that said Letters Patent is hereby corrected as shown below:

Claim 12, Column 25, Line 57
Replace "wherein each of the firs and second actuators includes a haptic touch" to "wherein each of the first and second actuators includes a haptic touch"

Signed and Sealed this
Twenty-eighth Day of August, 2012

David J. Kappos
*Director of the United States Patent and Trademark Office*